Jan. 23, 1940.  C. H. TEWELL  2,188,020
CORN CUTTER
Filed Oct. 24, 1938
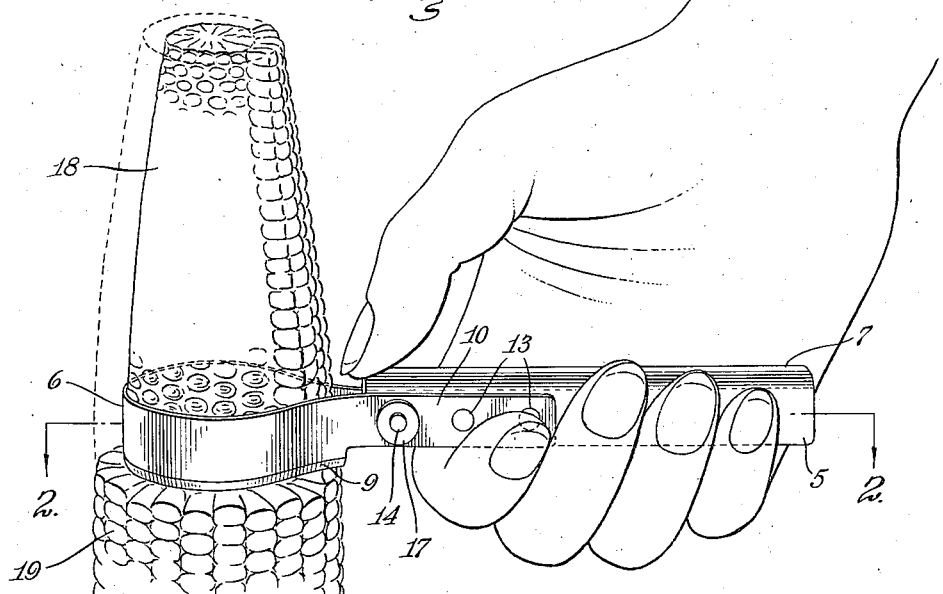
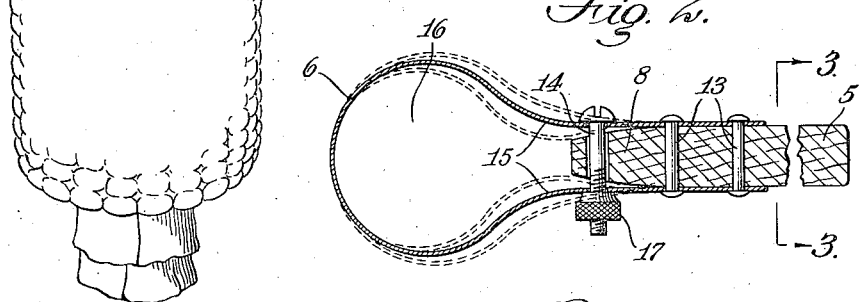
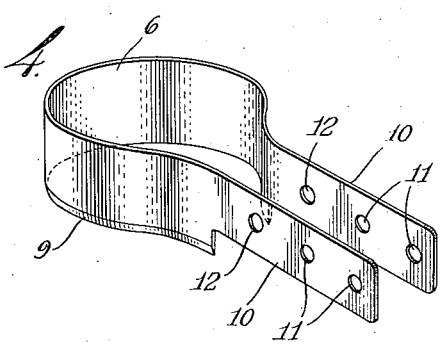
Coyle H. Tewell
INVENTOR
BY Victor J. Evans & Co.
ATTORNEYS Patented Jan. 23, 1940

2,188,020

UNITED STATES PATENT OFFICE 2,188,020

CORN CUTTER

Coyle H. Tewell, Robertsdale, Pa.

Application October 24, 1938, Serial No. 236,735

2 Claims. (Cl. 30—316)

The present invention relates to a new and improved device primarily adapted for removing in a cutting operation kernels of corn from a cob.

The primary object of the invention is to provide a cutting implement adapted to encircle an ear of corn and embodying means for adjusting the loop area of the device whereby ears of different sizes may be readily accommodated with the one cutter.

A further object of the invention is to provide a cutting implement including a handle having one end tapered on opposite sides thereof and adapted to receive a substantially cylindrical shaped member forming the cutting medium. Means is provided to adjust the loop area of the cutter whereby ears of corn of different sizes may be readily accommodated.

The invention will be fully and comprehensively understood from a consideration of the following detailed description when read in connection with the accompanying drawing which forms a part of the application.

In the drawing:

Figure 1 is a perspective view of the device and illustrating its use on an ear of corn;

Figure 2 is a longitudinal sectional view taken substantially on line 2—2 of Figure 1;

Figure 3 is a vertical sectional view through the handle member taken substantially on line 3—3 of Figure 2, and Figure 4 is a perspective view of the cutting implement removed from the handle.

Heretofore it has been the custom to remove green corn kernels from a cob with a conventional paring knife which has necessitated six or seven strokes of the knife to completely denude the kernels from the cob. The herein described invention will effectively remove the kernels in approximately two strokes, due to the cylindrical shape of the cutter and the fact that substantially one-half of the cob is acted upon during one stroke of the implement.

Referring to the drawing for a more detailed description thereof wherein there is illustrated the preferred embodiment of the invention, the numeral 5 indicates the handle to which the cylindrical shaped cutting implement, indicated generally by the numeral 6, is attached. The handle 5 is preferably formed with rounded surfaces 7 on the upper side thereof for convenience in handling as illustrated in Figure 3 of the drawing. The forward end 8 of the handle is tapered upon opposite sides thereof to allow sufficient flexing of the loop adjacent the attached ends so that the enlargement or diminishing of the area within the loop may be readily changed to accommodate its use with ears of different sizes. The means of flexing the loop will be hereinafter described.

The configuration of the cutting implement 6 is clearly illustrated in Figure 4 of the drawing and it will be noted that the loop area thereof is substantially cylindrical shaped. The lower edge 9 is suitably bevelled to form a cutting surface integral with the body of the device, and said implement is preferably formed of a material that will readily maintain a sharpened cutting edge as provided.

For attaching the cutting implement to the handle 5, there is provided a pair of arms 10 which are integral with the cutting implement as clearly illustrated and are of substantially the same width as said handle member. A series of openings 11 and 12 are formed in the arms through which the rivets 13 and adjusting screw 14 pass for attaching the cutting implement to the handle. It will be noted that the fastening elements 13 in the form of rivets or the like serve to hold that portion of the arms substantially flush with the outer surface of the handle and the openings 12 which accommodate the adjusting screw 14 are in a position substantially opposite from the tapered sides of said handle. This permits for readily flexing the portion 15 of the cutting implement to increase or decrease the loop area 16 thereof. It is readily understood that tightening the nut 17 will cause the area 15 to flex inwardly to reduce the loop area 16 and releasing the nut 17 will cause the area 15 to flex outwardly thereby increasing the loop area 16. The various flexing positions are clearly illustrated in Figure 2 of the drawing.

It is believed that the operation of the device is readily understood from the above description when considered with the illustrated drawing. In the use thereof, it is first necessary to adjust the loop area 16 proportionate to the diameter of the cob 18 whereupon the implement is grasped by the handle and positioned over the upper end of the cob. A downward stroke of the implement will remove the kernels 19 from a substantial area of the cob, it being understood that the cutter moves in one stroke throughout the length of the cob. The cutter is then removed and positioned to effect the removal of the kernels from the remaining portion of the cob thereby completely denuding the kernels from the cob with two downward strokes. When removing the kernels, the cob is preferably supported in a vertical position, as shown in the drawing, and may be held by the free hand of the user.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. An implement of the character described comprising a handle, a substantially cylindrical shaped member attached to said handle, said member having a cutting surface on one edge thereof, the forward end of said handle being tapered on opposite sides thereof for permitting adjusting of the loop area of said member, and means for attaching said cylindrical-shaped member to said handle to permit the adjustment of the loop area.

2. An implement of the character described comprising a handle, a substantially cylindrical shaped member having arms extending therefrom for attachment to said handle, said member having a cutting surface on one edge thereof, the forward end of said handle being tapered on opposite sides thereof, the ends of said arms extending beyond the tapered end of said handle and permanently attached thereto, and the intermediate portion of said arms being disposed over the tapered end of said handle and held thereon by means of an adjusting screw whereby the loop area of said cylindrical shaped member can be adjusted by flexing the intermediate portions thereof.

COYLE H. TEWELL.